Nov. 4, 1958 W. RIEHL ET AL 2,859,071
ROTARY SHAFT SEAL
Filed May 27, 1955 3 Sheets-Sheet 1

Inventors
Wilhelm Riehl &
Heinrich Benz
By
A. E. Jones
Attorney

Nov. 4, 1958 — W. RIEHL ET AL — 2,859,071
ROTARY SHAFT SEAL

Filed May 27, 1955 — 3 Sheets-Sheet 2

Inventors
Wilhelm Riehl &
Heinrich Benz
By
H. E. Jones, Attorney

Nov. 4, 1958

W. RIEHL ET AL 2,859,071

ROTARY SHAFT SEAL

Filed May 27, 1955

Inventors
Wilhelm Riehl &
Heinrich Benz
By
H. E. Jones
Attorney

United States Patent Office 2,859,071
Patented Nov. 4, 1958

2,859,071
ROTARY SHAFT SEAL

Wilhelm Riehl, Raunheim am Main, and Heinrich Benz, Kelsterbach am Main, Germany, assignors to General Motors Corporation, Detroit, Mich., a corporation of Delaware Application May 27, 1955, Serial No. 511,539

6 Claims. (Cl. 308—36.1)

This invention relates to the sealing of rotary shaft seals for shafts having bearings resiliently supported in housings. Such shafts can, to a certain extent, move radially and axially freely, thereby allowing shaft vibrations to be efficiently damped and preventing them from being transmitted to adjacent parts.

Frequently, the possibility of axial movement is also required for these shafts. One practical application, for example, is the output shaft of an automotive vehicle, where the drive is delivered through a transmission to a propeller shaft. To make the propeller shaft as short as possible, the transmission output shaft protrudes as much as possible out of the transmission case in an extension thereof. The end of the transmission output shaft is supported in a bearing in the extension of the transmission case and this bearing is rubber mounted to allow the shaft to move freely radially and axially, and to avoid the transmission of vibrations to the adjacent parts.

In a rigid type bearing, the radial seal is directly mounted in the housing. In this case, the elasticity of the sealing lip of the radial seal is quite sufficient to compensate for the relatively small vibrations of the shaft, so that the sealing lip remains tight in any position of the shaft. In the case of rubber mounted bearings, however, where considerably greater vibrations occur, it is not possible to mount the radial shaft seal directly in the housing without the danger of the sealing lip losing contact with the surface of the shaft and being destroyed.

The invention enables resiliently supported shafts to be sealed in the housing and accordingly a radial seal embraces the shaft and is resiliently supported from the housing so as to follow the radial vibrations of the shaft.

The scope of the invention is defined by the appended claims; and how it can be carried into effect is hereinafter particularly described with reference to the accompanying drawings, in which:

In the several figures of the drawings, like parts are indicated by like reference numerals and the repetition of description of such parts is avoided in the following description.

Figure 1:
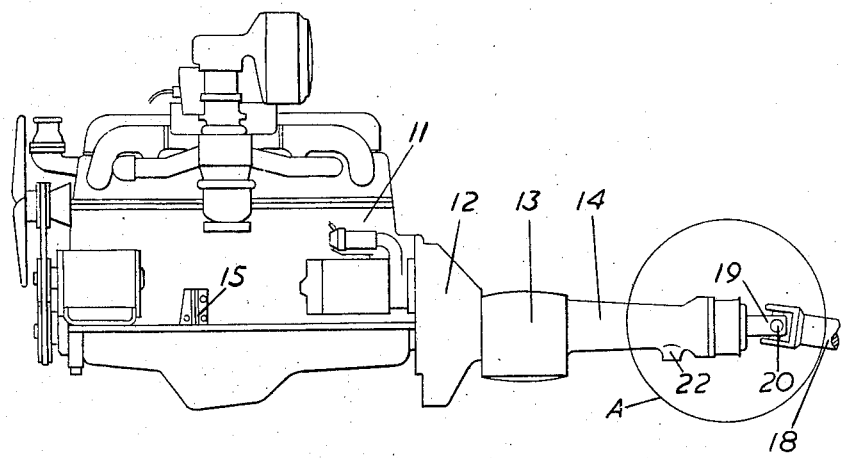
Figure 1 is a side view of the power unit of a motor vehicle.

An engine 11, clutch 12, transmission 13 and shaft casing 14 are supported as a unit from the frame of the vehicle on two resilient supports 15, one on each side of the engine, and a resilient support beneath a boss 22 on the transmission extension 14. Drive from the engine 11 is transmitted through the clutch 12 and the transmission 13 to the output shaft 16 which includes a slidable yoke member 17 having one 19 of a front universal joint 20 formed thereon. The other yoke of the joint 20 is on the propeller shaft 18. The parts of the output shaft 16 are splined at 31 to permit the movement of the member 17 inwardly and outwardly of the extension 14.

A longitudinal rib 32 is cast in the upperpart of one side of the extension 14 to form a trough slightly inclined towards the rear. Lubrication oil passes down the trough from the transmission 13 to a bearing for the slidable member 17; two transverse ribs 33 and 34 are cast into the extension 14 at the end of the trough.

The bearing (Figures 2 and 3) consists of a thick-walled steel sleeve 35 into which a bush 36 for the slidable member 17 is pressed. The steel sleeve 35 is mounted in one of a pair of bushes 37 and 38 between which a rubber cushion 39 is bonded. The outer bush 37 is secured in an enlarged portion 40 of the extension 21, and the inner thicker bush 38 extends beyond the steel sleeve 35 and bush 36 to accommodate a shaft seal 41.

The shaft seal 41 between the inner bush 38 and the slidable member 17 prevents infiltration of dirt from outside and loss of lubrication oil. The oil supplied to the bearing through the trough flows through a passage 42 (Figure 3) on the periphery of the steel sleeve 35 into the space between the bearing and the shaft seal 41, whence it returns through a passage 43 located below to the casing 14 and back to the transmission 13. Thus the shaft seal 41 can be supplied with oil, and heat generated by friction in the bearing can be removed by the oil before reaching the rubber cushion 39.

To protect the bearing and seal, a bell-shaped cap 44 is fitted on a collar 45 on the slidable member 17 to surround the extension of the bush 38 beyond the sleeve 35 and a cylindrical concentric cap 46 is fitted on a machined part 47 of the enlarged portion 40 of the extension 21 to overlap the bell-shaped cap 44.

In an alternative embodiment (Figure 4) there is a pair of concentric bushes 50, 51 with a rubber cushion 53 bonded between them. The outer bush 50 is secured in the end of the extension 21 and the inner bush 51 is lined with a thin layer of babbit metal 54. The inner bush 51 is longer than the outer bush 50 and carries a sheet metal cap 55 containing a shaft seal 56. The slidable member 17 has a number of grooves 57 and the bush 51 a groove 58. Oil drips from the trough in the extension 21 onto the ends of the lubrication grooves 57 on the slidable member 17. When the vehicle is driven, oil is carried through the bearing to the shaft seal 56 by reciprocatory movement of the slidable member 17. Excess oil flows back through the lower longitudinal groove 58 into the extension 21.

Figure 2:
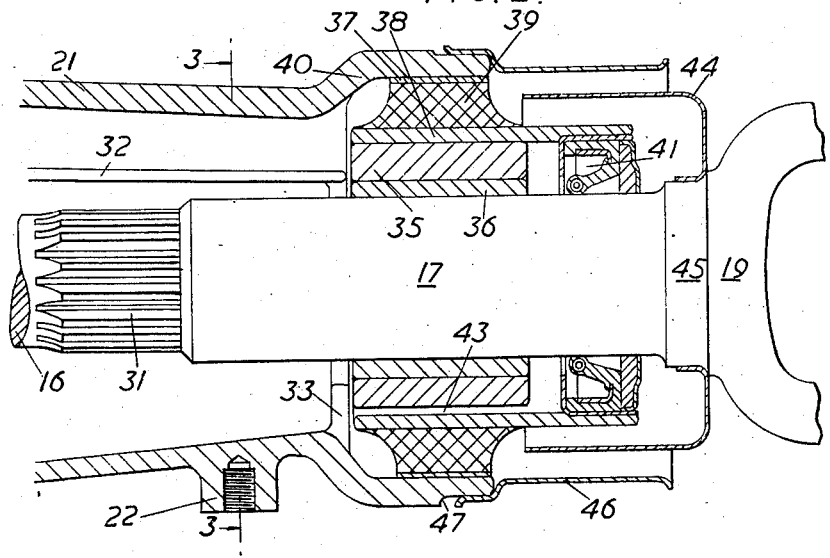
Fig. 2 is a longitudinal section, to an enlarged scale, of the part A shown in Figure 1, showing a seal according to the invention.
Figure 3:
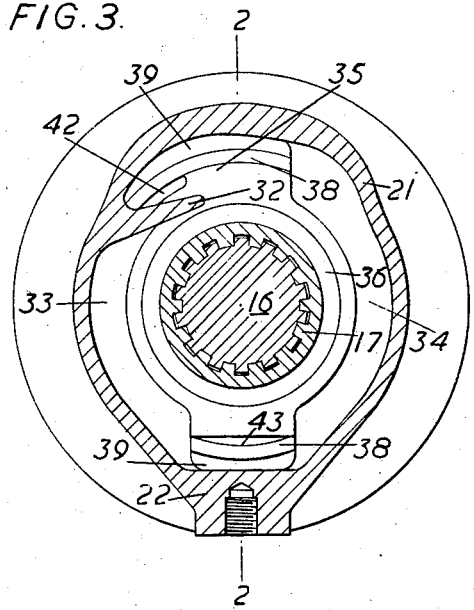
Figure 3 is a section on line 3—3 of Figure 2.
Figure 4:
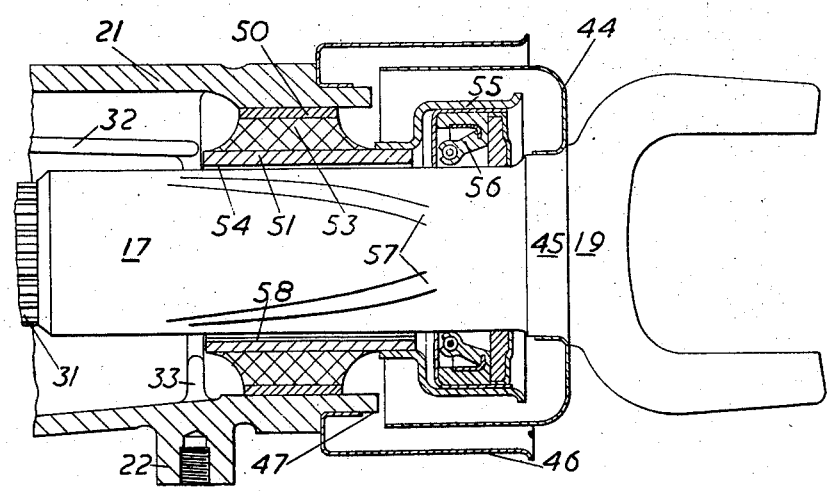
Figures 4 and 5 are sections similar to Figure 2 of alternative embodiments of seals according to the invention.

In both the embodiments shown in Figures 2 and 4, the radial shaft seals 41 and 56 follow the radial vibrations of the shaft. The rubber cushion seals the space between the extension 21 and the shaft seal.

In a further alternative (Figure 5) a rubber cushion 77 is bonded between inner and outer bushes 78, 79. A radial shaft seal 71 is supported from the extension 21 by a flexible resilient member formed as a cylindrical part 73 of rubber bonded to the cage 72 of the shaft seal 71 and to a ring 74, which is pressed into the extension 21. To increase the flexibility of the rubber part 73 an annular groove 75 is formed in its periphery between the ring 74 and cage 72. The rubber part 73 may also have reinforcement metal inserts. The requisite firm seating of the sealing lip 76 on the slidable member 17 is maintained despite the vibrations of the output shaft.

Several longitudinal grooves 80 are formed in the outer bush 79 to form lubrication channels. Such channels can also or alternatively be formed in the inner bush 78 or in the rubber cushion 77.

Figure 5:
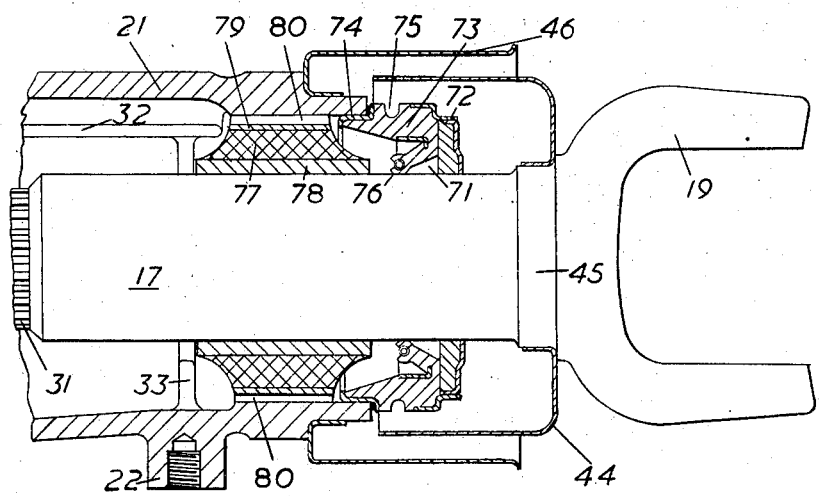

The whole bearing is sealed so that in the case of collapse of the rubber cushion 77, no oil can escape to the outside. The rubber part 73 can extend axially of the shaft as shown in Figure 5 or may taper at a more or less acute angle frustro-conically to the extension 21.

We claim:

1. Power delivery means for the transmissions of automotive vehicles and the like and comprising a casing having an output shaft projecting therefrom, bearing means supporting said output shaft in rotatable and axially movable relation to said casing, seal means disposed outwardly of said bearing means and adapted to seal said shaft against the loss of lubricating oil from said casing, resilient support means disposed in the end of said casing around said bearing means and supporting said bearing means and said shaft within said casing, and means associated with said casing and said bearing means for circulating oil for cooling said bearing and seal means from said casing through said bearing means and to said seal means and from said seal means to said casing through said bearing means.

2. Power delivery means as defined by claim 1 and in which said lubricating oil is delivered to said bearing and seal means by a longitudinal rib extending along the upper part of said casing above said output shaft.

3. Power delivery means as defined by claim 1 and in which said casing is formed to provide a longitudinal rib and a pair of transverse ribs within an extension part of said casing, said longitudinal rib being disposed above said output shaft, said transverse ribs being adapted to extend from the end of said longitudinal rib around said output shaft at the end of said bearing means opposite said seal means, said transverse ribs being spaced at the ends thereof opposite said longitudinal rib to provide for the return flow of oil from said bearing and seal means.

4. Power delivery means as defined by claim 1 and in which said seal means is located in an annular sleeve having a reduced end secured to said bearing means, said resilient support means being secured between said bearing means and an outer bush adapted to be rigidly mounted in said casing.

5. Power delivery means as defined by claim 1 and in which said resilient support means is made in two parts, each part being assembled separately in said casing with one of said parts supporting said seal means being of flexible cylindrical form and extending outwardly of said casing beyond said bearing means.

6. Power delivery means as defined by claim 1 in which said seal means is supported on said casing by said resilient support means.

References Cited in the file of this patent

UNITED STATES PATENTS

| | | |
|---|---|---|
| 1,923,649 | Warner | Aug. 22, 1933 |
| 2,070,081 | Henry | Feb. 9, 1937 |
| 2,563,778 | Fasoli | Aug. 7, 1951 |

FOREIGN PATENTS

| | | |
|---|---|---|
| 747,847 | Germany | Oct. 18, 1944 |